(EXPL. 3)

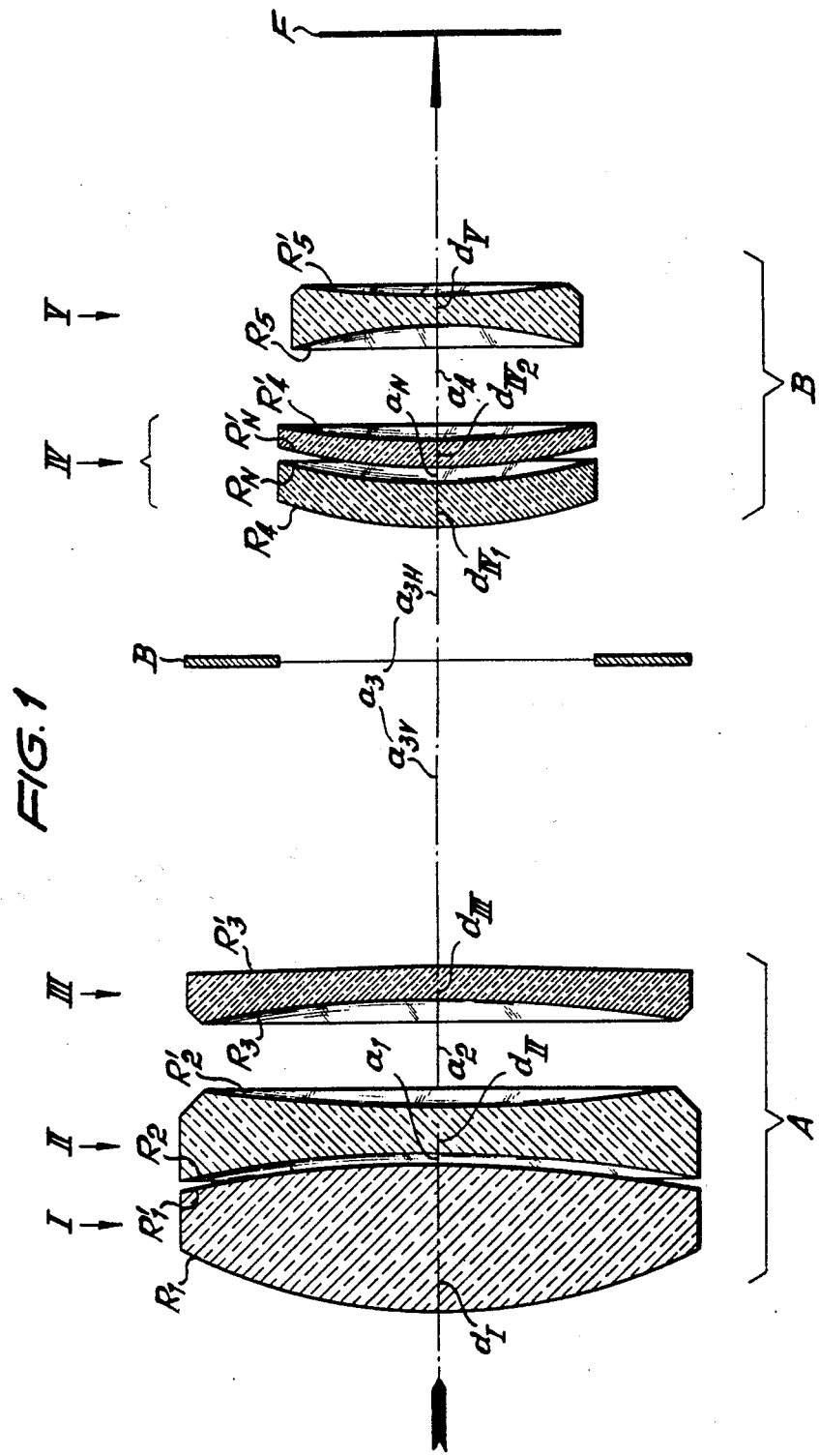

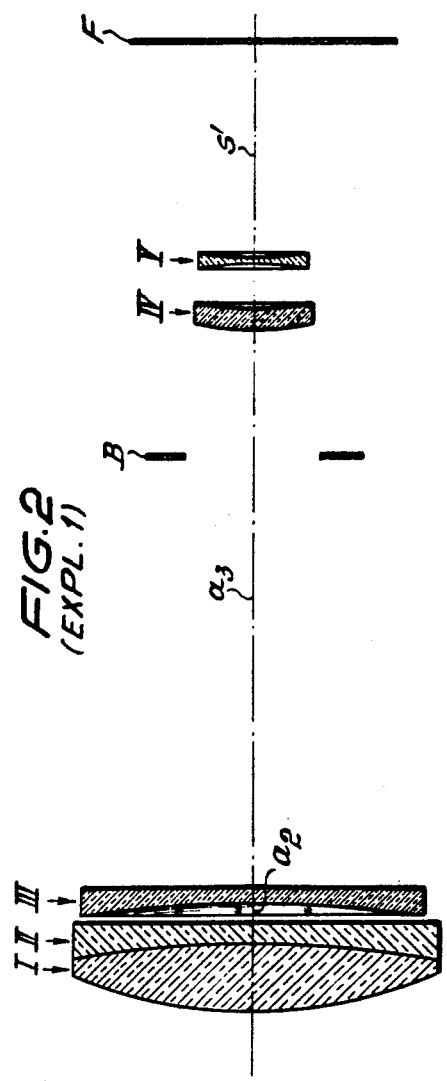
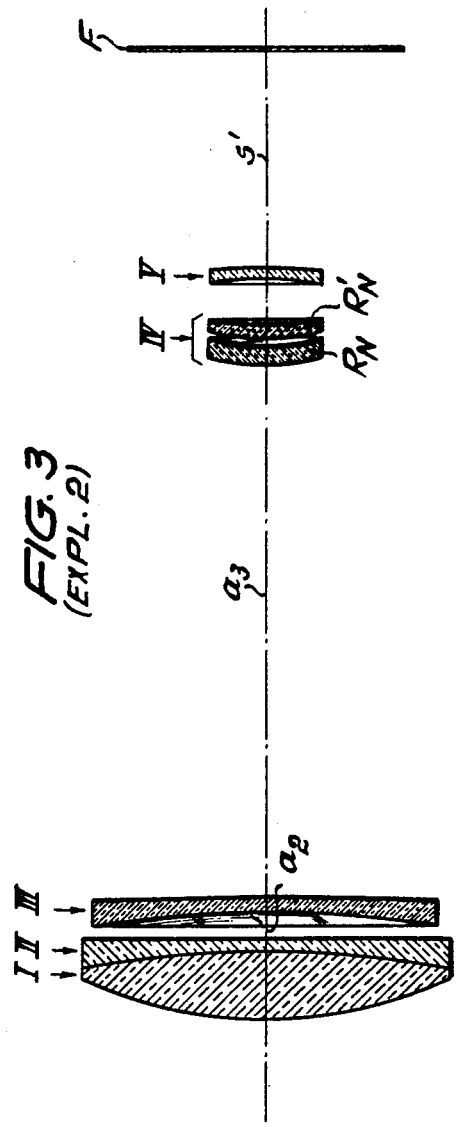

(EXPL. 4)

(EXPL.5)

United States Patent Office 3,388,956
Patented June 18, 1968

---

3,388,956
PHOTOGRAPHIC TELEPHOTO LENSES OF HIGH TELEPHOTO POWER
Joachim Eggert, Ernst Tronnier, and Fritz Ueberhagen, Braunschweig, Germany, assignors to Voigtlander A.G., Braunschweig, Germany, a corporation of Germany
Filed Apr. 9, 1964, Ser. No. 358,426
Claims priority, application Germany, Apr. 10, 1963, V 23,924
13 Claims. (Cl. 350—176)

ABSTRACT OF THE DISCLOSURE

A telephoto lens for photographic purposes having a high telephoto power. The telephoto lens consists of a tele-positive in front and a tele-negative facing the film and separated by a large air space. The tele-positive (A) consists, proceeding sequentially from the longer conjugate to the shorter conjugate, of a converging lens having a positive refractive power equal to from 1.5 to 3 times the equivalent refractive power $\Phi$ of the entire lens system, a first diverging lens following the converging lens, and a second diverging lens following the first diverging lens. The tele-negative (B) limits the air space and consists of a front element facing the object and having positive refractive power, this front element being followed, toward the shorter conjugate, by a negative partial element of the tele-negative. The thickness of the air lens between the tele-positive (A) and the tele-negative (B), measured along the optical axis, is from 1/3 to 2/3 of the equivalent focal length of the entire lens system. The second diverging lens (III) in the last position of the tele-positive (A) and the first converging lens element (IV) of the tele-negative (B) following the air space ($a_3$) have refractive powers consisting of the sums of the refractive powers of their individual surfaces such that the sum of the refractive powers ($\varphi_{III}+\varphi_{IV}$) is between 2/3 and 3/2 of the equivalent refractive power $\Phi$, and the two inner surfaces ($R_3'$ and $R_4$) of the two elements (III and IV) limiting the air space ($a_3$) have refractive powers ($\varphi_3'+\varphi_4$) such that the large air lens included between them has a converging refractive power of from 3/2 to $10/2\Phi$. The absolute value of the quotient of the refractive power ($\varphi_{IV}$) of the converging lens (IV) on that side of the tele-negative (B) facing the image, divided by the refractive power ($\varphi_{III}$) of the diverging lens (III) of the tele-positive (A) on the side facing the object is from 2.5 to 5.0.

---

Figure 4:
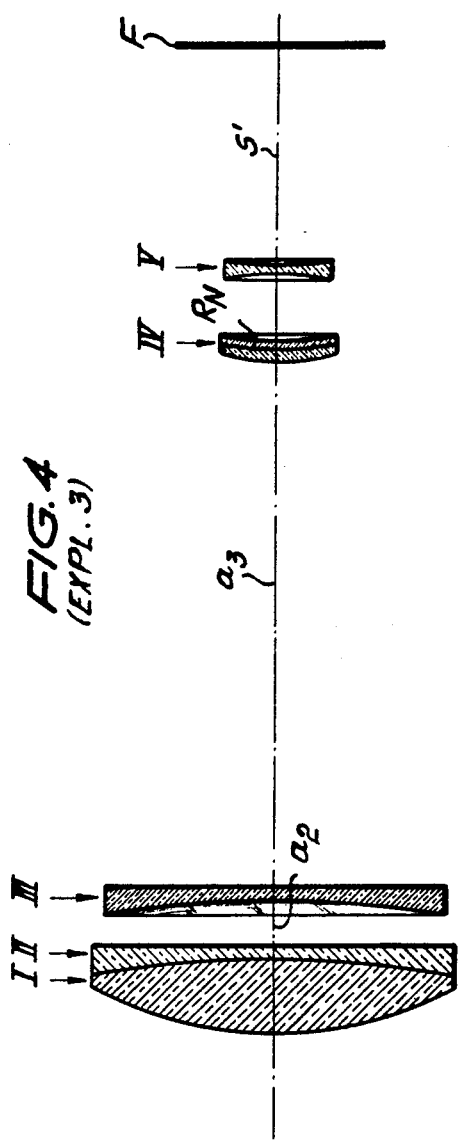

This invention relates to a telephoto photographic lens with anastigmatic flattening of the image field and high telephoto power.

The present invention is directed to an improvement on telephoto lenses of the type shown and described in Swiss Patent No. 327,354. In telephoto lenses, according to this Swiss patent, the tele-positive facing the longer conjugate consists of a converging lens and two diverging lenses following the converging lens in the direction toward the image. This design of telephoto lenses is particularly suitable for greater relative apertures, as it provides for keeping the zonal aberration errors of the widely diverging light rays at a small value.

In accordance with the present invention, the improvement on the lens of this Swiss patent provides a further increase in the telephoto effect and of the relative aperture well beyond the limitations of the original design, and this is achieved simultaneously with reduction of the zonal aberration errors in, and particularly outside of, the optical axis. The invention further provides an objective with very long focal length which can nevertheless be attached to cameras in which the shutter is comparatively close to the image plane. In order to make this possible, the objective must, as is known to those skilled in the art, have a very high telephoto power for reasons associated with the camera mechanism. Advantage can be taken of this effect only if it is assured that deviations, arising in the recombination of the image in the axis and outside of the axis, can be kept so small that the image quality is not impaired.

In accordance with the present invention, the known difficulties hitherto encountered in attempts to obtain, simultaneously, a high telephoto power and very small residual aberrations are overcome without an undesirable increase in the cost of the component parts of the lens.

More particularly, the present invention is directed to a novel distribution of the refractive powers of lenses limiting or defining a large air space between the telepositive in the front of the lens and the tele-negative in the rear thereof. The air lens formed by this air space, and usually having the diaphragm positioned therein, is defined by the two solid transparent lenses which limit it, in such a way that the second diverging lens (III), which is in the last position of the tele-positive, and the first converging lens (IV) of the tele-negative, which follows the large air space and faces the object, are designed with surfaces of such refractive powers that the sum of the refractive powers of the glass-air interfaces of these two inner lenses (III and IV), which limit the air space or air lens, is larger than 2/3 of the equivalent refractive power $\Phi$ without however exceeding 3/2$\Phi$. The two inner surfaces ($R_3'$ and $R_4$) directly enclosing the large air space are, at the same time, provided with a refractive power such that the air lens formed thereby has a strongly positive refractive power which is greater than 3/2$\Phi$, without however exceeding a value of $10/2\Phi$, with $\Phi$ again being the equivalent refractive power of the lens system.

Due to this principle of design, the lens of the present invention differs radically from those suggested by the prior art, in which an effort was made to give the large air space only a relatively weak positive refractive power, or even a strong negative refractive power, in order to reduce, if possible, the under-correction effects which are always an attribute of positive refractive powers. This design principle, which has hitherto seemed to be necessary in telephoto lenses can, in accordance with the present invention, be ignored if a three-element tele-positive with two diverging lenses is used. It is this step which provides the novel and surprising advance in the art over the objective according to the above-mentioned Swiss Patent No. 327,354.

In further accordance with the invention, another advantage, in addition to the advantages just mentioned, can be obtained by extending the above-mentioned design principle. Thus, it is possible, in accordance with the present invention, to increase the lateral recombination of the image in the marginal areas of the image for high power objectives with a telephoto effect of 5.0 or more, and to a very great extent. This has hitherto been impossible to achieve. In the present invention, this desirable result is obtained by matching the refractive power of the first lens (IV) of the tele-negative, which borders the air space on the side facing the image, and the refractive power of the negative lens (III), which borders the air space on the side facing the object, and in such a manner that the absolute value of the ratio of the sum of the refractive powers of the glass-air interfaces of the lens (IV), facing the image, to the sum of the refractive powers of the negative lens (III), which limits the air space toward the second conjugate and which is in the second position, is greater than 2.5 but does not exceed 5.0.

In known tele-anastigmatics lenses with a telephoto effect of approximately between 2.5 and 4.0, there has been an air lens in the tele-positive between the two diverging lenses which follow a converging lens, and the intrinsic refractive power of such air lens has been between $+0.5\Phi$ and $-0.5\Phi$. This has led to a substantial elimination of spherical aberration and to a satisfactory fulfillment of the sinus-condition.

In accordance with the present invention, it has been found that an additional and more precise elimination of the intermediate coma aberration in the lateral image field can be obtained by going beyond the limits previously used and inserting, between the two negative lenses (II and III) of the tele-positive, a dispersing air lens with an intrinsic refractive power between 0.436 and $-1.0\Phi$. As contrasted to known lenses of this general design, the lenses of the present invention can be built with focal lengths of 180 mm. to over 200 mm. and still be mounted in miniature cameras. The older telephoto lens, mentioned above and having a relative aperture of approximately 4.5 to 4.7, can be used only with focal lengths up to approximately 150 mm. or 165 mm., as they are otherwise difficult to mount and as the aberration, which increases with the focal length, does not permit a satisfactory recombination of the image.

The increase in aberration becomes particularly disturbing in telephoto lenses with long focal lengths because, due to the placement of the main shutter on the side toward the camera at a comparatively small distance from the plane of the film the angle formed by the leading rays on the side facing the image becomes very large. The result is that the locations of the exit pupil and of the diaphragm are at the very end of the lens systems. Therefore, the diaphragm is not located in the vicinity of the optical center of the entire objective, and cannot be moved to the point which is most favorable for image correction. Rather, the positions of the diaphragm and of the exit pupils are determined by the mechanical design of the camera, which has nothing to do with the lens system per se. This makes it much more difficult to eliminate distortion of the image and to assure minimum interference with the light rays and, therefore, a minimum of vignetting. In the present invention, these difficulties, which are well known to those skilled in the art, are overcome without having to make concessions with respect to the desired sharpness of the image.

The outstanding advantages of the present invention are particularly apparent if a comparison is made of the recombination of the image for a point at the edge of the image, generated by a leading ray forming an angle of 6° on the side facing the object. In known telephoto lenses with high telephoto power, the longitudinal astigmatic difference in settings ranges from 3 per thousand and 3% of the focal length of the objective. However, even a comparatively simple objective of the present invention has an astigmatic difference in settings of 56.8387μ (micromillimeters) for an objective with a focal length of $f=100$ mm. This difference is thus less than 0.6 per thousand of the equivalent focal length.

Figure 5:
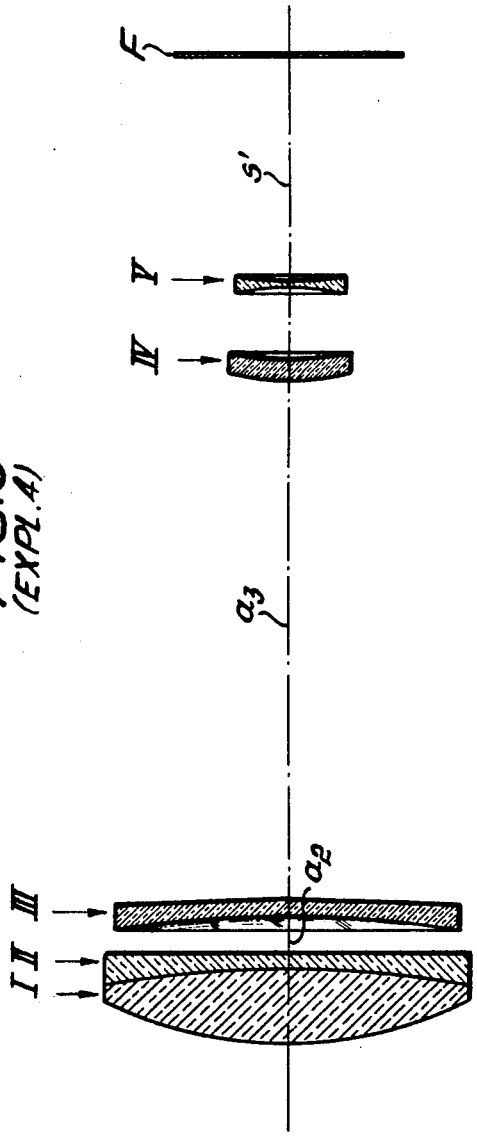
Figure 6:
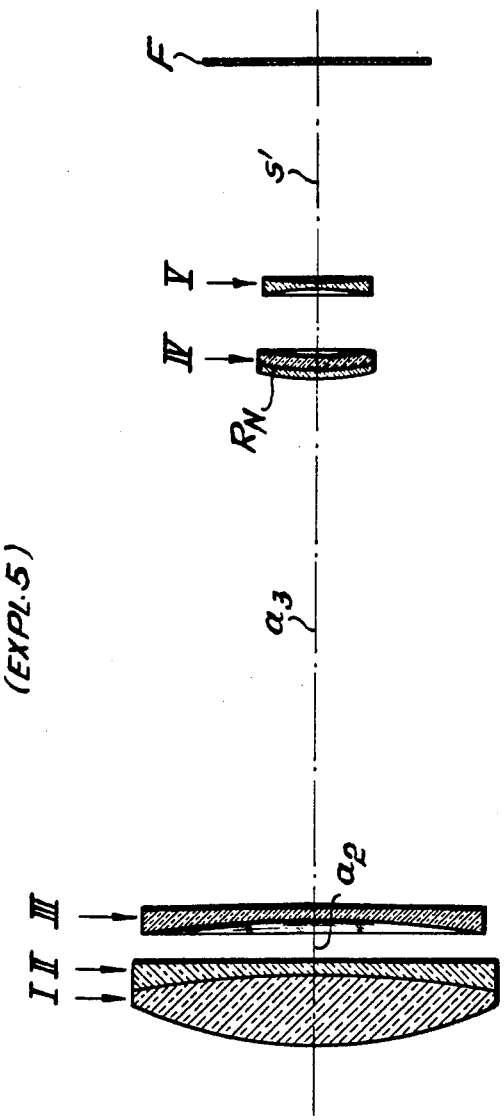

For an understanding of the principles of the present invention, reference is made to the following description of typical embodiments thereof as illustrated in the accompanying drawings. In the drawings:

FIG. 1 is a schematic view of a lens embodying the present invention, with the first element following the large air gap between the tele-positive and tele-negative in the direction of travel of the light rays consisting, as one possible design, of two adjoining lenses; and FIGS. 2 through 6 are views similar to FIG. 1 and illustrating other embodiments of the invention corresponding to numerical examples given hereinafter and drawn to the scale of 2:1.

In the drawings, the symbols correspond to those used in the following numerical tables, with A being the tele-positive, B the tele-negative, I through V the elements of the lenses, R the radii of curvature, $d$ the axial thicknesses of the individual lenses, and $a$ the axial distances between lenses, with the thicknesses of, and the distances between, lenses being measured along the optical axis of the objective. The glasses used are characterized by their reflective indices $n_d$ for the yellow line of the helium spectrum, with the color dispersion being characterized by the Abbé number. All of the elements are numbered consecutively from the side of the longer conjugate to the side of the shorter conjugate. The lens surfaces facing the object are given reference symbols such as $R_1$, $R_2$, $R_3$, etc., and those lens surfaces facing the image have been given references such as $R_1'$, $R_2'$, $R_3'$, etc. The diaphragm is indicated at B, and F indicates the image plane of film placed in the camera. $s'$ is the intercept lens of the objective, for example, the axial distance from the apex of the last lens (V) to the plane F of the image. While all of the reference symbols shown in FIG. 1 are not necessarily shown again in FIGS. 2 through 6, they apply to the examples of FIGS. 2 through 6 in the same manner as they apply to FIG. 1.

In those cases where element IV is divided, as in FIGS. 1, 3, 4 and 6, that one of the pair of adjoining surfaces which faces the object is indicated by $R_N$, and that which faces the image is indicated by $R_N'$. $a_N$ is the air gap between these two lenses, and $d_{IV_1}$ and $d_{IV_2}$ indicate the thicknesses of the lenses. In the same manner as element IV, any of the other elements I through V can, in the present objective, be designed as a single lens or as a compound element. This may be effected, for example, by the provision of an internal pair of adjoining surfaces as, for example, $R_N$ and $R_N'$ in FIG. 1, which are designed as cemented surfaces or which can enclose an air lens between them.

If element IV is designed as such a doublet, the lens facing the object can be made either with a positive or with a negative refractive sign. Also, in a borderline case, it can be made with a vonHoegh null-meniscus, with these variations in the design of the parts of the positive element IV falling within the scope of the invention. This is also shown in the following numberical example, in which this element has the following external shape:

$$0.150f < R_4 < 0.500f$$
$$0.125f < R_N < 0.750f$$
$$0.250f < R_4' < 2.500f$$

In this case, $R_4$ is the outside radius facing the object, and $R_4'$ is the outside radius facing the image, of the element IV. The pair of adjoining surfaces which may be intermediate these surfaces is characterized by $R_N$ or by $R_N$, $R_N'$. The equivalent focal length of the lens system is $f$.

If element IV consists of two lenses, the second lens can be designed either with positive or negative refractive power, with the particular shape selected falling within the scope of the invention as long as the shape is within the limits set forth above. The composition of element IV thus permits the attainment of excellent correction of the lens system with a minimum of expense for instance for color photography. Because of the closeness to the diaphragm, only lenses having very small diameters can be utilized at this point, and the individual elements can be made very small, whereas, in the front element, the diameter of the lenses is more than twice as large and the division of an element into two adjoining elements would result in very much higher cost.

Five examples are given in the following numerical tables, in which all of the data refers to the unit of focal length $f=1.00$, and all the objectives have relative apertures 1:4.0 and a telephoto effect of approximately 5.0. The refractive powers of the surfaces and of the lenses are set forth in subsidiary tables from which the refractive powers in accordance with the invention can easily be obtained. The total refractive power of the system is called $\Phi$ in the examples. $\varphi_1$, $\varphi_1'$, $\varphi_2$, $\varphi_2'$, $\varphi_3$, $\varphi_3'$ are the refractive powers of the lens surfaces defined for each surface therein by each refractive-index-difference with respect to the medium air and by the radii $R_1$, $R_1'$, $R_2$, $R_2'$, $R_3$, $R_3'$ and $\varphi_I$, $\varphi_{II}$, $\varphi_{III}$ are the refractive powers of the lenses, i.e., the arithmetic sums of the refractive powers of the surfaces of lenses I, II, III. The equivalent focal length of the entire system is called $f$.

EXAMPLE 1 (FIG. 2)

(a) *Table of design parameters*

[$f=1.00$   Relative aperture, 1:4]

| | | | |
|---|---|---|---|
| $R_1=+0.42156$ | $d_I=0.06676$ | $n_I=1.64250$ | $\nu_I=58.09$ |
| $R_1'=-0.88214$ | $a_1=0$ (cemented) | | |
| $R_2=-0.88214$ | $d_{II}=0.01945$ | $n_{II}=1.72830$ | $\nu_{II}=28.66$ |
| $R_2'=-18.00073$ | $a_2=0.01183$ | air | |
| $R_3=-1.37288$ | $d_{III}=0.01945$ | $n_{III}=1.65446$ | $\nu_{III}=33.79$ |
| $R_3'=-5.30649$ | $a_{3V}=0.40290$ diaphragm $a_{3H}=0.11913$ | $a_3=0.52203$ air | |
| $R_4=+0.34202$ | $d_{IV}=0.02234$ | $n_{IV}=1.75787$ | $\nu_{IV}=31.56$ |
| $R_4'=+1.17496$ | $a_4=0.03859$ | air | |
| $R_5=-0.31069$ | $d_V=0.00526$ | $n_V=1.65016$ | $\nu_V=39.31$ |
| $R_5'=+0.69782$ | | | |

Intercept length $s'=0.20324$.   Telephoto effect: 4.9.

(b) *Table of distribution of the refractive powers*

$\varphi_1=+1.5241\Phi$ $\varphi_1'=+0.7283\Phi$ $\varphi_I=+2.2524\Phi$ $\varphi_2=-0.8256\Phi$ $\varphi_2'=+0.0405\Phi$ $\varphi_{II}=-0.7851\Phi$ $\varphi_3=-0.4767\Phi$ $\varphi_3'=+0.1233\Phi$ $\varphi_{III}=-0.3534\Phi$ Large air space $\varphi_4=+2.2159\Phi$ $\varphi_4'=-0.6450\Phi$ $\varphi_{IV}=+1.5709\Phi$ $\varphi_5=-2.0926\Phi$ $\varphi_5'=-0.9317\Phi$ $\varphi_V=-3.0243\Phi$ (c) *Range of design parameters*

The following relations apply to Example 1:

| | and therefore is between: |
|---|---|
| $\varphi_{III}+\varphi_{IV}=1.2175\Phi$ | $2/3\Phi$ and $3/2\Phi$ |
| $\varphi_3'+\varphi_4=2.339\Phi$ | $3/2\Phi$ and $10/2\Phi$ |
| $|\varphi_{IV}/\varphi_{III}|=4.4451$ | 2.5 and 5.0 |
| $R_4=0.342f$ | $0.15f$ and $0.5f$ |
| $R_4'=1.175f$ | $0.25f$ and $2.5f$ |

EXAMPLE 2 (FIG. 3)

(a) *Table of design parameters*

[$f=1.00$   Relative aperture, 1:4]

| | | | |
|---|---|---|---|
| $R_1=+0.38589$ | $d_I=0.06491$ | $n_I=1.62041$ | $\nu_I=60.29$ |
| $R_1'=-1.07109$ | $a_1=0$ (cemented) | | |
| $R_2=-1.07109$ | $d_{II}=0.01278$ | $n_{II}=1.72151$ | $\nu_{II}=29.28$ |
| $R_2'=+118.1496$ | $a_2=0.01974$ | air | |
| $R_3=-1.35840$ | $d_{III}=0.01963$ | $n_{III}=1.65446$ | $\nu_{III}=33.79$ |
| $R_3'=-14.34764$ | $a_3=0.50022$ | air | |
| $R_4=+0.23845$ | $d_{IV1}=0.02096$ | $n_{IV1}=1.85820$ | $\nu_{IV2}=23.4$ |
| $R_N=+0.22391$ | $a_N=0.00200$ | air | |
| $R_N'=+0.22672$ | $d_{IV2}=0.01453$ | $n_{IV2}=1.72372$ | $\nu_{IV2}=38.09$ |
| $R_4'=+0.45495$ | $a_4=0.03935$ | air | |
| $R_5=-0.29283$ | $d_V=0.00846$ | $n_V=1.65016$ | $\nu_V=39.31$ |
| $R_5'=+0.75155$ | | | |

Intercept length $s'=0.20370$.   Telephoto effect: 4.9.

(b) *Table of distribution of the refractive powers*

$\varphi_1=+1.6077\Phi$ $\varphi_1'=+0.5792\Phi$ $\varphi_I=+2.1869\Phi$ $\varphi_2=-0.6736\Phi$ $\varphi_2'=-0.0061\Phi$ $\varphi_{II}=-0.6797\Phi$ $\varphi_3=-0.4818\Phi$ $\varphi_3'=+0.0456\Phi$ $\varphi_{III}=-0.4362\Phi$ Large air space $\varphi_4=+3.5991\Phi$ $\varphi_N=-3.8328\Phi$ $\varphi_N'=+3.1921\Phi$ $\varphi_{IV}=+1.3676\Phi$ $\varphi_4'=-1.5908\Phi$ $\varphi_5=-2.2203\Phi$ $\varphi_5'=-0.8651\Phi$ $\varphi_V=-3.0854\Phi$ (c) *Range of design parameters*

The Following relations apply to Example 2:

| | and therefore is between: |
|---|---|
| $\varphi_{III}+\varphi_{IV}=0.9314\Phi$ | $2/3\Phi$ and $3/2\Phi$ |
| $\varphi_3'+\varphi_4=3.645\Phi$ | $3/2\Phi$ and $10/2\Phi$ |
| $|\varphi_{IV}/\varphi_{III}|=3.142\Phi$ | 2.5 and 5.0 |
| $R_4=0.238f$ | $0.15f$ and $0.5f$ |
| $R_N=0.224f$ | $0.125f$ and $0.75f$ |
| $R_N'=0.227f$ | $0.125f$ and $0.75f$ |
| $R_4'=0.455f$ | $0.25f$ and $2.5f$ |

EXAMPLE 3 (FIG. 4)

(a) *Table of design parameters*

[f=1.00    Relative aperture, 1:4]

| | | | |
|---|---|---|---|
| $R_1=+0.36908$ | $d_I=0.06652$ | $n_I=1.58784$ | $\nu_I=68.19$ |
| $R_1'=-1.36852$ | $a_1=0$ (cemented) | | |
| $R_2=-1.36852$ | $d_{II}=0.01267$ | $n_{II}=1.69895$ | $\nu_{II}=30.05$ |
| $R_2'=+45.96305$ | $a_2=0.04250$ | air | |
| $R_3=-1.17775$ | $d_{III}=0.01584$ | $n_{III}=1.65446$ | $\nu_{III}=33.79$ |
| $R_3'=-32.03058$ | $a_3=0.49416$ | air | |
| $R_4=+0.20316$ | $d_{IV1}=0.00898$ | $n_{IV1}=1.75520$ | $\nu_{IV1}=27.53$ |
| $R_N=+0.34197$ | $a_4=0$ (cemented) | | |
| $R_N'=+0.34197$ | $d_{IV2}=0.00792$ | $n_{IV2}=1.62079$ | $\nu_{IV2}=31.10$ |
| $R_4'=0.38075$ | $a_5=0.06124$ | air | |
| $R_5=-0.27715$ | $d_V=0.00924$ | $n_V=1.65017$ | $\nu_V=33.69$ |
| $R_5'=+0.84610$ | | | |

Intercept length $s'=0.20310$.    Telephoto effect: 4.9.

(b) *Table of distribution of the refractive powers*

$\varphi_1=+1.5927\Phi$ $\varphi_1'=+0.4295\Phi$ $\qquad \varphi_I=+2.0222\Phi$ $\varphi_2=-0.5107\Phi$ $\varphi_2'=-0.0152\Phi$ $\qquad \varphi_{II}=-0.5259\Phi$ $\varphi_3=-0.5557\Phi$ $\varphi_3'=+0.0204\Phi$ $\qquad \varphi_{III}=-0.5353\Phi$ Large air space $\varphi_4=+3.7173\Phi$ $\varphi_N=-2.2084\Phi$ $\varphi_N'=+1.8153\Phi$ $\qquad \varphi_{IV}=+1.6938\Phi$ $\varphi_4'=-1.6304\Phi$ $\varphi_5=-2.3459\Phi$ $\varphi_5'=-0.7684\Phi$ $\qquad \varphi_V=-3.1143\Phi$ (c) *Range of design parameters*

The following relations apply to Example 3:

| | and therefore is between: |
|---|---|
| $\varphi_{III}+\varphi_{IV}=1.158\Phi$ | $2/3\Phi$ and $3/2\Phi$ |
| $\varphi_3'+\varphi_4=3.7377\Phi$ | $3/2\Phi$ and $10/2\Phi$ |
| $\|\varphi_{IV}/\varphi_{III}\|=3.160\Phi$ | 2.5 and 5.0 |
| $R_4=0.203f$ | $0.15f$ and $0.5f$ |
| $R_N=0.342f$ | $0.125f$ and $0.75f$ |
| $R_N'=0.342f$ | $0.125f$ and $0.75f$ |
| $R_4'=0.381f$ | $0.25f$ and $2.5f$ |
| $-\varphi_{a2}=0.571\Phi$ | $0.436\Phi$ and $1.0\Phi$ |

EXAMPLE 4 (FIG. 5)

(a) *Table of design parameters*

[f=1.00    Relative aperture, 1:4]

| | | | |
|---|---|---|---|
| $R_1=+0.38368$ | $d_I=0.06625$ | $n_I=1.62041$ | $\nu_I=60.29$ |
| $R_1'=-1.12022$ | $a_1=0$ (cemented) | | |
| $R_2=-1.12022$ | $d_{II}=0.01393$ | $n_{II}=1.72151$ | $\nu_{II}=29.28$ |
| $R_2'=+18.00405$ | $a_2=0.03260$ | air | |
| $R_3=-1.34795$ | $d_{III}=0.01840$ | $n_{III}=1.65446$ | $\nu_{III}=33.79$ |
| $R_3'=-18.83797$ | $a_3=0.48557$ | air | |
| $R_4=+0.23572$ | $d_{IV}=0.02261$ | $n_{IV}=1.72372$ | $\nu_{IV}=38.09$ |
| $R_4'=+0.45151$ | $a_4=0.06352$ | air | |
| $R_5=-0.28257$ | $d_V=0.0084$ | $n_V=1.65016$ | $\nu_V=39.31$ |
| $R_5'=+0.95933$ | | | |

Intercept length $s'=0.20777$.    Telephoto effect: 4.8.

(b) *Table of distribution of the refractive powers*

$\varphi_1=+1.6170\Phi$ $\varphi_1'=+0.5538\Phi$ $\qquad \varphi_I=+2.1708\Phi$ $\varphi_2=-0.6441\Phi$ $\varphi_2'=-0.0401\Phi$ $\qquad \varphi_{II}=-0.6842\Phi$ $\varphi_3=-0.4855\Phi$ $\varphi_3'=+0.0035\Phi$ $\qquad \varphi_{III}=-0.4820\Phi$ Large air space $\varphi_4=+3.0703\Phi$ $\varphi_4'=-1.6029\Phi$ $\qquad \varphi_{IV}=+1.4674\Phi$ $\varphi_5=-2.3009\Phi$ $\varphi_5'=-0.6777\Phi$ $\qquad \varphi_V=-2.9786\Phi$ (c) *Range of design parameters*

The following relations apply to Example 4:

| | and therefore is between: |
|---|---|
| $\varphi_{III}+\varphi_{IV}=0.985\Phi$ | $2/3\Phi$ and $3/2\Phi$ |
| $\varphi_3'+\varphi_4=3.073\Phi$ | $3/2\Phi$ and $10/2\Phi$ |
| $\|\varphi_{IV}/\varphi_{III}\|=3.044\Phi$ | 2.5 and 5.0 |
| $R_4=0.236f$ | $0.15f$ and $0.5f$ |
| $R_4'=0.452f$ | $0.25f$ and $2.5f$ |
| $-\varphi_{a2}=0.525\Phi$ | $0.436\Phi$ and $1.0\Phi$ |

EXAMPLE 5 (FIG. 6)

(a) *Table of design parameters*

[f=1.00    Relative aperture, 1:4]

| | | | |
|---|---|---|---|
| $R_1=+0.38711$ | $d_I=0.06631$ | $n_I=1.62041$ | $\nu_I=60.29$ |
| $R_1'=-1.12833$ | $a_1=0$ (cemented) | | |
| $R_2=-1.12833$ | $d_{II}=0.01263$ | $n_{II}=1.72151$ | $\nu_{II}=29.28$ |
| $R_2'=+14.40868$ | $a_2=0.03789$ | air | |
| $R_3=-1.33509$ | $d_{III}=0.01579$ | $n_{III}=1.65446$ | $\nu_{III}=33.79$ |
| $R_3'=-31.57490$ | $a_3=0.49388$ | air | |
| $R_4=+0.23592$ | $d_{IV1}=0.00631$ | $n_{IV1}=1.85820$ | $\nu_{IV1}=23.40$ |
| $R_N=+0.23592$ | $a_4=0$ (cemented) | | |
| $R_N'=+0.23592$ | $d_{IV2}=0.01578$ | $n_{IV2}=1.72372$ | $\nu_{IV2}=38.09$ |
| $R_4'=+0.46853$ | $a_5=0.05962$ | air | |
| $R_5=-0.27275$ | $d_V=0.00579$ | $n_V=1.65016$ | $\nu_V=39.31$ |
| $R_5'=+1.11156$ | | | |

Intercept length $s'=0.20433$.    Telephoto effect: 4.9.

(b) *Table of distribution of the refractive powers*

$\varphi_1 = +1.6027\Phi$ $\varphi_I = +2.1525\Phi$ $\varphi_1' = +0.5498\Phi$ $\varphi_2 = -0.6394\Phi$ $\varphi_{II} = -0.6895\Phi$ $\varphi_2' = -0.0501\Phi$ $\varphi_3 = -0.4902\Phi$ $\varphi_{III} = -0.4695\Phi$ $\varphi_3' = +0.0207\Phi$ Large air space $\varphi_4 = +3.6377\Phi$ $\varphi_N = -3.6377\Phi$ $\varphi_{IV} = +1.5230\Phi$ $\varphi_N' = +3.0677\Phi$ $\varphi_4' = -1.5447\Phi$ $\varphi_5 = -2.3837\Phi$ $\varphi_V = -2.9686\Phi$ $\varphi_5' = -0.5849\Phi$ (c) *Range of design parameters*

The following relations apply to Example 5: and therefore is between:

| | | |
|---|---|---|
| $\varphi_{III}+\varphi_{IV}=1.054\Phi$ | 2/3$\Phi$ and 3/2$\Phi$ |
| $\varphi_3'+\varphi_4=3.659\Phi$ | 3/2$\Phi$ and 10/2$\Phi$ |
| $|\varphi_{IV}/\varphi_{III}|=3.248\Phi$ | 2.5 and 5.0 |
| $R_4=0.236f$ | 0.15$f$ and 0.5$f$ |
| $R_N=0.236f$ | 0.125$f$ and 0.75$f$ |
| $R_N'=0.236f$ | 0.125$f$ and 0.75$f$ |
| $R_4'=0.469f$ | 0.25$f$ and 2.5$f$ |
| $-\varphi_{a2}=0.540\Phi$ | 0.436$\Phi$ and 1.0$\Phi$ |

Those skilled in the art will be able to deviate from the numerical examples given above and thus be able, within the scope of the invention, to develop other examples of telephoto lenses of the special type described above and having the advanced properties thereof, for special purposes or applications if the principles of design and the rules disclosed herein are followed.

The numerical data given above represent lens systems with a high degree of correction. If it is desired to use these examples in designing objectives embodying the invention for special purposes, the design data may be varied as indicated in part in the range of Design Parameters in the examples, approximately within the following limits: The radii (R) may be varied up to ±20% of their length, the axial thicknesses (d) of the lenses and of the axial air spaces (a) between the lenses up to ±0.05 of the total focal length (f), and the refractive powers ($\varphi$) up to ±0.3 of the equivalent refractive power $\Phi$ of the entire lens system. The characteristics of the glass, for example, the refractive indices $n_d$ and the Abbé number $\nu$ should be varied only within a narrow range of about the indicated values, with consideration of the variations of the individual lots of glass.

While specific embodiments of the invention have been shown and described in detail to illustrate the application of the principles of the invention, it will be understood that the invention may be embodied otherwise without departing from such principles.

What is claimed is:

1. In a photographic telephoto lens consisting of a tele-positive in front and a tele-negative facing the film and separated by a large air space, and wherein the tele-positive (A) consists, proceeding sequentially from the longer conjugate to the shorter conjugate, of a converging lens having a positive refractive power equal to from 2.022 to 2.253 times the equivalent refractive power $\Phi$ of the entire lens system, a first diverging lens following said converging lens, and a second diverging lens following said first diverging lens, with the tele-negative (B) limiting the air space consisting of a front element facing the object and having positive refractive power and followed, toward the shorter conjugate, by a negative partial element of the tele-negative, and with the thickness of the air lens between tele-positive (A) and the tele-negative (B), measured along the optical axis, being from 0.485 to 0.523 of the equivalent focal length of the entire lens system: the improvement comprising the second diverging lens (III) in the last position of the tele-positive (A) and the first converging lens element (IV) of the tele-negative (B) following the air space ($a_3$) having refractive powers, consisting of the sums of the refractive powers of their individual surfaces, such that the sum of the refractive powers ($\varphi_{III}+\varphi_{IV}$) is between 0.931 and 1.218 of the equivalent refractive power $\Phi$; the two inner surfaces ($R_3'$ and $R_4$) of the two elements (III and IV) limiting the air space ($a_3$) having refractive powers ($\varphi_3'+\varphi_4$) such that the large air lens included between them has a converging refractive power of from 2.339 to 3.738$\Phi$, and the absolute value of the quotient of the refractive power ($\varphi_{IV}$) of the converging lens (IV) on that side of the tele-negative (B) facing the image, divided by the refractive power ($\varphi_{III}$) of the diverging lens (III) of the tele-positive (A) on the side facing the object being from 3.044 to 4.446.

2. A photographic telephoto objective, as claimed in claim 1, in which the positive element (IV) of the tele-negative (B) following the air space ($a_3$) has radii of the following values:

$$0.203f \leq R_4 \leq 0.343f$$
$$0.223f \leq R_N \leq 0.342f$$
$$0.380f \leq R_4' \leq 1.175f$$

in which $R_4$ is the outside radius of element (IV) on the side facing the object, and $R_4'$ is the outside radius of said element on the side facing the image, with $R_N$ being the radius of a pair of interior adjoining surfaces and in which $f$ is the focal length of the entire objective.

3. A photographic telephoto objective, as claimed in claim 1, including a diverging air lens ($a_2$) between the first diverging lens (II) of the tele-positive (A) and the diverging lens (III) limiting the converging air lens ($a_3$) on the side toward the tele-positive (A); the sum of the refractive powers of the surfaces of the diverging air lens ($-\varphi_{a2}=\varphi_2'+\varphi_3$), is between 0.436 and 0.571 times the equivalent refractive power $\Phi$.

4. A photographic telephoto objective, as claimed in claim 1, in which the refractive powers of the lenses are as follows:

$$\varphi_I = +2.3\Phi$$
$$\varphi_{II} = -0.8\Phi$$
$$\varphi_{III} = -0.4\Phi$$
$$\varphi_{IV} = +1.6\Phi$$
$$\varphi_V = -3.0\Phi$$

5. A photographic telephoto objective, as claimed in claim 4, having the following design parameters for a focal length of 1.00:

| | | | |
|---|---|---|---|
| $R_1=+0.42156$ | $d_I=0.06676$ | $n_I=1.64250$ | $\nu_I=58.09$ |
| $R_1'=-0.88214$ | $a_1=0$ (cemented) | | |
| $R_2=-0.88214$ | $d_{II}=0.01945$ | $n_{II}=1.72830$ | $\nu_{II}=28.66$ |
| $R_2'=-18.00073$ | $a_2=0.01183$ | air | |
| $R_3=-1.37288$ | $d_{III}=0.01945$ | $n_{III}=1.65446$ | $\nu_{III}=33.79$ |
| $R_3'=-5.39649$ | $a_{3V}=0.40290$ diaphragm $a_{3H}=0.11913$ | $a_3=0.52203$ air | |
| $R_4=+0.34202$ | $d_{IV}=0.02234$ | $n_{IV}=1.75787$ | $\nu_{IV}=31.56$ |
| $R_4'=+1.17496$ | $a_4=0.03859$ | air | |
| $R_5=-0.31069$ | $d_V=0.00526$ | $n_V=1.65016$ | $\nu_V=39.31$ |
| $R_5'=+0.69782$ | | | |

$s'=0.20324$. Relative aperture: 1:4.

6. A photographic telephoto objective, as claimed in claim 1, in which the refractive powers of the lenses are as follows:

$$\varphi_I = +2.2\Phi$$
$$\varphi_{II} = -0.7\Phi$$
$$\varphi_{III} = -0.4\Phi$$
$$\varphi_{IV} = +1.4\Phi$$
$$\varphi_V = -3.1\Phi$$

7. A photographic telephoto objective, as claimed in claim 6, having the following design parameters for a focal length of $f = 1.00$:

| | | | |
|---|---|---|---|
| $R_1 = +0.38589$ | $d_I = 0.06491$ | $n_I = 1.62041$ | $v_I = 60.29$ |
| $R_1' = -1.07109$ | $a_1 = 0$ (cemented) | | |
| $R_2 = -1.07109$ | $d_{II} = 0.01278$ | $n_{II} = 1.72151$ | $v_{II} = 29.28$ |
| $R_2' = +118.1496$ | $a_2 = 0.01974$ | air | |
| $R_3 = -1.35840$ | $d_{III} = 0.01963$ | $n_{III} = 1.65446$ | $v_{III} = 33.79$ |
| $R_3' = -14.34764$ | $a_3 = 0.50022$ | air | |
| $R_4 = +0.23845$ | $d_{IV_1} = 0.02096$ | $n_{IV_1} = 1.85820$ | $v_{IV_1} = 23.4$ |
| $R_N = +0.22391$ | $a_N = 0.00200$ | air | |
| $R_N' = +0.22672$ | $d_{IV_2} = 0.01453$ | $n_{IV_2} = 1.72372$ | $v_{IV_2} = 38.09$ |
| $R_4' = +0.45495$ | $a_4 = 0.03935$ | air | |
| $R_5 = -0.29283$ | $d_V = 0.00846$ | $n_V = 1.65016$ | $v_V = 39.31$ |
| $R_5' = +0.75155$ | | | |

$s' = 0.20370$. Relative aperture, 1:4.

8. A photographic telephoto objective, as claimed in claim 1, in which the refractive powers of the lenses are as follows:

$$\varphi_I = +2.0\Phi$$
$$\varphi_{II} = -0.5\Phi$$
$$\varphi_{III} = -0.5\Phi$$
$$\varphi_{IV} = +1.7\Phi$$
$$\varphi_V = -3.1\Phi$$

9. A photographic telephoto objective, as claimed in claim 8, having the following design parameters for a focal length of $f = 1.00$:

| | | | |
|---|---|---|---|
| $R_1 = +0.36908$ | $d_I = 0.06652$ | $n_I = 1.58784$ | $v_I = 68.19$ |
| $R_1' = -1.36852$ | $a_1 = 0$ (cemented) | | |
| $R_2 = -1.36852$ | $d_{II} = 0.01267$ | $n_{II} = 1.69895$ | $v_{II} = 30.05$ |
| $R_2' = +45.96305$ | $a_2 = 0.04250$ | air | |
| $R_3 = -1.17775$ | $d_{III} = 0.01584$ | $n_{III} = 1.65446$ | $v_{III} = 33.79$ |
| $R_3' = -32.03058$ | $a_3 = 0.49416$ | air | |
| $R_4 = +0.20316$ | $d_{IV_1} = 0.00898$ | $n_{IV_1} = 1.75520$ | $v_{IV_1} = 27.53$ |
| $R_N = +0.34197$ | $a_4 = 0$ (cemented) | | |
| $R_N' = +0.34197$ | $d_{IV_2} = 0.00792$ | $n_{IV_2} = 1.62079$ | $v_{IV_2} = 31.10$ |
| $R_4' = +0.38075$ | $a_5 = 0.06124$ | air | |
| $R_5 = -0.27715$ | $d_V = 0.00924$ | $n_V = 1.65017$ | $v_V = 33.69$ |
| $R_5' = +0.84610$ | | | |

$s' = 0.20310$. Relative aperture, 1:4.

10. A photographic telephoto objective, as claimed in claim 1, which the lenses have the following refractive powers:

$$\varphi_I = +2.2\Phi$$
$$\varphi_{II} = -0.7\Phi$$
$$\varphi_{III} = -0.5\Phi$$
$$\varphi_{IV} = +1.5\Phi$$
$$\varphi_V = -3.0\Phi$$

11. A photographic telephoto objective, as claimed in claim 10, having the following design parameters for a focal length of $f = 1.00$:

| | | | |
|---|---|---|---|
| $R_1 = +0.38368$ | $d_I = 0.06625$ | $n_I = 1.62041$ | $v_I = 60.29$ |
| $R_1' = -1.12022$ | $a_1 = 0$ (cemented) | | |
| $R_2 = -1.12022$ | $d_{II} = 0.01393$ | $n_{II} = 1.72151$ | $v_{II} = 29.28$ |
| $R_2' = +18.00405$ | $a_2 = 0.03260$ | air | |
| $R_3 = -1.34795$ | $d_{III} = 0.01840$ | $n_{III} = 1.65446$ | $v_{III} = 33.79$ |
| $R_3' = -18.83797$ | $a_3 = 0.48557$ | air | |
| $R_4 = +0.23572$ | $d_{IV} = 0.02261$ | $n_{IV} = 1.72372$ | $v_{IV} = 38.09$ |
| $R_4' = +0.45151$ | $a_4 = 0.06352$ | air | |
| $R_5 = -0.28257$ | $d_V = 0.0084$ | $n_V = 1.65016$ | $v_V = 39.31$ |
| $R_5' = +0.95933$ | | | |

$s' = 0.20777$. Relative aperture, 1:4.

12. A photographic telephoto objective, as claimed in claim 1, in which the refractive powers of the lenses are as follows:

$$\varphi_I = +2.2\Phi$$
$$\varphi_{II} = -0.7\Phi$$
$$\varphi_{III} = -0.5\Phi$$
$$\varphi_{IV} = -1.5\Phi$$
$$\varphi_V = -3.0\Phi$$

13. A photographic telephoto objective, as claimed in claim 12, characterized by the following parameters for a focal length of $f = 1.00$:

| | | | |
|---|---|---|---|
| $R_1 = +0.38711$ | $d_I = 0.06631$ | $n_I = 1.62041$ | $v_I = 60.29$ |
| $R_1' = -1.12833$ | $a_1 = 0$ (cemented) | | |
| $R_2 = -1.12833$ | $d_{II} = 0.01263$ | $n_{II} = 1.72151$ | $v_{II} = 29.28$ |
| $R_2' = +14.40868$ | $a_2 = 0.03789$ | air | |
| $R_3 = -1.33509$ | $d_{III} = 0.01579$ | $n_{III} = 1.65446$ | $v_{III} = 33.79$ |
| $R_3' = -31.57490$ | $a_3 = 0.49388$ | air | |
| $R_4 = +0.23592$ | $d_{IV_1} = 0.00631$ | $n_{IV_1} = 1.85820$ | $v_{IV_1} = 23.40$ |
| $R_N = +0.23592$ | $a_4 = 0$ (cemented) | | |
| $R_N' = +0.23592$ | $d_{IV_2} = 0.01578$ | $n_{IV_2} = 1.72372$ | $v_{IV_2} = 38.09$ |
| $R_4' = +0.46853$ | $a_5 = 0.05962$ | air | |
| $R_5 = -0.27275$ | $d_V = 0.00579$ | $n_V = 1.65016$ | $v_V = 39.31$ |
| $R_5' = +1.11156$ | | | |

$s' = 0.20433$. Relative aperture, 1:4.

References Cited

UNITED STATES PATENTS 2,730,017   1/1956   Tronnier _____ 350—216

JOHN K. CORBIN, *Primary Examiner.*

DAVID H. RUBIN, *Examiner.*